United States Patent [19]

Deblock et al.

[11] Patent Number: 5,207,572
[45] Date of Patent: May 4, 1993

[54] METHOD AND APPARATUS FOR THE TREATMENT AND RECOVERY OF MINERAL FIBER OR GLASS WASTE

[75] Inventors: Roger Deblock, Brussels, Belgium; Petrus J. H. D. Bakx, Etten-Leur, Netherlands

[73] Assignee: Isover Saint-Gobain, Aubervilliers Cedex, France

[21] Appl. No.: 886,836

[22] Filed: May 22, 1992

Related U.S. Application Data

[62] Division of Ser. No. 557,776, Jul. 26, 1990, Pat. No. 5,156,545.

[30] Foreign Application Priority Data

Jul. 26, 1989 [FR] France .................. 89 10043

[51] Int. Cl.⁵ .................................... F27B 9/28
[52] U.S. Cl. .................................. 432/58; 432/59; 432/8; 432/72
[58] Field of Search ............... 432/59, 8, 72, 58; 110/272

[56] References Cited

U.S. PATENT DOCUMENTS

| | | | |
|---|---|---|---|
| 1,758,075 | 5/1930 | Duncan | 110/272 |
| 2,743,529 | 5/1956 | Hayes | 432/72 |
| 3,304,619 | 2/1967 | Futer | 432/77 |
| 3,522,936 | 8/1970 | Geipel et al. | 432/59 |
| 3,550,922 | 12/1970 | Geipel | 432/59 |
| 4,338,079 | 7/1982 | Faulkner et al. | 432/58 |
| 4,373,946 | 2/1983 | Kilian | 432/8 |
| 4,503,018 | 3/1985 | Gardner et al. | 432/72 |
| 4,529,379 | 7/1985 | DiCastri | 432/59 |
| 4,591,336 | 5/1986 | Konczalski | 432/8 |
| 4,767,320 | 8/1988 | Sasaki et al. | 432/59 |
| 4,789,332 | 12/1988 | Ramsey et al. | 432/59 |
| 4,790,967 | 12/1988 | Anderlind et al. | 432/58 |
| 4,792,302 | 12/1988 | Baker et al. | 432/59 |

FOREIGN PATENT DOCUMENTS

| | | |
|---|---|---|
| 3710744 | 10/1988 | Fed. Rep. of Germany . |
| 1244355 | 9/1960 | France . |
| 2424237 | 11/1979 | France . |

Primary Examiner—Henry C. Yuen
Attorney, Agent, or Firm—Oblon, Spivak, McClelland, Maier & Neustadt

[57] ABSTRACT

The present invention relates to an apparatus treating waste comprising introducing a glass or mineral fiber substrate (7) contaminated with organic materials into a chamber (1) of a furnace by means of a conveyor belt (4), subjecting it to a gas consisting of a neutral gas and between 0 and 10% by volume of oxygen, heated to a temperature below the melting temperature of the waste substrate in order to pyrolyze the organic materials, and recovering the waste substrate. This apparatus has particular application to the recovery of the vitreous material forming the waste substrate, in order to recycle it for use in a glass melting furnace.

6 Claims, 1 Drawing Sheet

METHOD AND APPARATUS FOR THE TREATMENT AND RECOVERY OF MINERAL FIBER OR GLASS WASTE

This is a division, of application Ser. No. 07/557,776, filed on Jul. 26, 1990, U.S. Pat. No. 5,516,545.

BACKGROUND OF THE INVENTION

1. Field of the Invention

The present invention relates to the treatment of mineral fiber or glass based waste, in particular glass fibers, contaminated with an organic substance to recover the vitreous material substantially free of organic substance, and use it as cullet in glass melting furnaces.

2. Discussion of the Background

The waste of mineral fiber and glass products containing organic materials poses disposal problems, not only due to their volume, but also due to the pollution they cause. For example, some mineral fiber binders used are formaldehyde, phenol and urea resins comprising free formaldehyde and phenol. These are hazardous, toxic substances subject to strict pollution control regulations. Furthermore, the vitreous material contained in this waste is an expensive product which is useful to recover.

It is usual to use ground waste glass, known as cullet, as a base material introduced into a melting furnace for the manufacture of glass. This waste glass serves in particular to assist the fusion of the other basic materials.

A problem arises when it is desired to use as cullet glass waste treated with a synthetic resin or mineral fiber waste used in insulating products contaminated with an organic substance serving as the binder thereof because these binders are generally phenoplast resins (formaldehyde—phenol—urea resins) or aminoplast resins (formaldehyde—urea—melamine resins). When this waste is melted in a conventional furnace, a low quality glass is obtained which has certain defects preventing its use as a base material in the manufacture of high quality glass (low energy transmission in the furnaces, tendency to form foam owing to the simultaneous presence of both reduced and oxidized vitreous materials).

Thus, the presence of organic contaminants in the waste glass fibers means that large quantities of oxidizing agents, such as sodium sulfate, have to be introduced in to the melting furnace. This causes $SO_2$ to be given off in amounts greater than current pollution standards allow. These standards are likely to become even more restrictive in the future.

SUMMARY OF THE INVENTION

It is accordingly an object of the present invention to provide a method for treating glass- or mineral fiber-based waste contaminated with organic substances, which eliminates these organic substances and provides a non-reduced vitreous material which can be used in melting furnaces for manufacturing glass.

It is another object of the invention to provide a device for performing this method.

The method of the invention for treating waste comprising a substrate formed of glass or mineral fibers contaminated with organic substances, comprises introducing the ground or shredded waste into a decomposition furnace where it is subjected to a hot gas mixture having a temperature lower than the melting temperature of the waste substrate to pyrolyze the organic matter. The gas mixture comprises a neutral gas and 0 to 10 vol. % of oxygen. The substrate is then recovered from the waste.

BRIEF DESCRIPTION OF THE FIGURE

The figure schematically illustrates the furnace used in the invention.

DETAILED DESCRIPTION OF THE PREFERRED EMBODIMENTS

Figure 1:
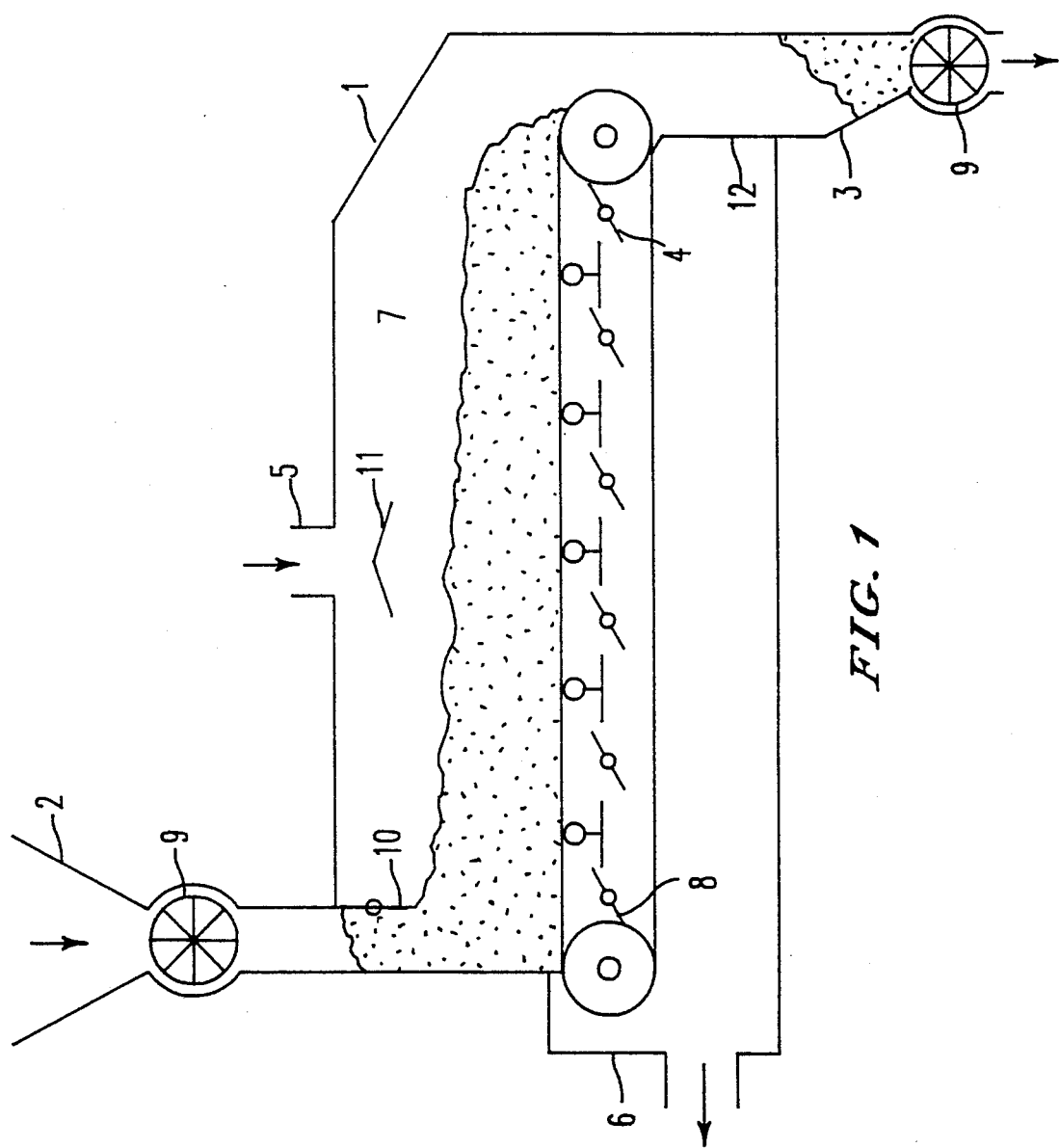

With the method of the invention, given the temperature used, the vitreous material forming the waste substrate does not melt. Thus the possibility is avoided of organic material being present in the molten vitreous material which, remaining trapped after this material has cooled, would impart to the recovered product properties which would render it unusable as cullet.

With the method of the invention the material recovered is a non-reduced or practically non-reduced product. Therefore, the addition of an oxidizing agent, such as sodium sulfate (which results in the release of $SO_2$) to compensate for the presence of reducing elements is not required. If an oxidizing agent is added, it is in a small quantity, corresponding to the amount usually used in the melting furnace in order to oxidize the organic material contained in the other base materials for the subsequent production of glass, thus minimizing the release of $SO_2$.

With the method of the invention the vitreous material forming the waste substrate is recovered in its initial form. Thus, flakes are recovered from waste shredded in the form of flakes. Finely ground waste in powder form yields a powdered recovered product.

The device for performing the method for treating the waste comprises a pyrolyzing furnace. A furnace of this type is illustrated schematically in the FIGURE which is given solely by way of example.

The pyrolyzing furnace for performing the method according to the invention for treating the waste comprising a substrate formed of glass or mineral fibers contaminated with organic substances, comprises an elongate chamber (1) having at the top an input hopper (2) for the waste to be treated, and at the bottom an output hopper (3) for the treated waste, a substantially horizontal conveyor belt (4) provided with perforations for the passage of gas, which receives the waste falling from the input hopper and conveys it to above the output hopper, an inlet pipe (5) for the gas comprising a neutral gas and between 0 and 10% by volume oxygen heated to a temperature lower than the melting temperature of the waste substrate for the heat decomposition of the organic substances, and an outlet pipe (6) for the fumes which have passed through the bed (7) formed by the waste and the conveyor belt. As shown in the drawing, the elongate chamber (I) of the furnace comprises at the top (on the left-hand side in the FIGURE) the input hopper (2) for the waste to be treated and at the bottom (on the right-hand side of the FIGURE) the output hopper (3) for the treated waste. The substantially horizontal conveyor belt (4) is made from stainless steel, for example, and is provided with perforations (not shown) for the passage of the gas.

At the top of the furnace there is located the inlet pipe (5) for the hot gas required for the pyrolysis of the organic substances, said pipe being connected to a source for said gas (not shown). On the left-hand side of the furnace, as viewed in the FIGURE, there is located the outlet pipe (6) for the gases which have passed through the bed (7) and the conveyor belt (4), via the perforations with which said conveyor belt is provided, said bed (7) comprising the waste deposited on said conveyor belt. This gas outlet pipe (6) may, if desired, be connected to a gas recycling device (not shown).

Movable flaps (8) are placed inside the conveyor belt in order to regulate the pressure of the hot gas passing through the bed (7), the flaps (8) to be adjusted according to the bed thickness, the density of the waste and the rate of elimination of the organic material. These flaps are also used to adjust the pressure so that a suitable distribution of the gas delivery from one end of the conveyor belt to the other is obtained. A preferential path of the gas from the inlet pipe (5) to the outlet pipe (6), without bypassing the bed (7) and conveyor belt (4) and traveling around to the underside of the conveyor belt is ensured by a shield (12).

Drums (9) provided with cells are arranged inside the inlet hopper (2) and outlet hopper (3) for regulating the inlet and outlet deliveries of the waste and to close the furnace chambers. It is also possible to use any other air lock system enabling the atmosphere to be controlled.

The inlet hopper (2) may further comprise a plate (10) for regulating the thickness of the bed of waste deposited on the conveyor belt.

A deflector (11) is disposed opposite the aperture of the hot gas inlet pipe (5) in order to distribute the gases over the entire length of the waste bed.

The method and apparatus of the invention are particularly useful for treating mineral fiber waste, such as glass fiber waste, contaminated with aminoplast or phenoplast binders. The content of binder present in these fibers may vary from 5 to 20%, and usually, from approximately 6 to approximately 7% by weight. This waste may originate from waste generated during the production of insulating products, or from recovery of used insulating products. This waste may also comprise fibrous products having a structure similar to that used for insulation, but instead, used for plant culture. In this case, the waste may further contain water and roots in addition to the organic materials forming the fiber binder.

In order to perform the method of the invention, if the waste to be processed consists of fibers, it is preferable that the fibers are shredded (for example, in the form of flakes) before they are introduced into the furnace.

Any shredding device can be used for this purpose. Suitable shredding devices are those described in French patent Nos. 2,591,621 and 2,639,868. Shredding the waste enables it to be homogenized. This is particularly important when the waste to be treated comprises mixtures of different materials; for example, mixtures of insulating materials and materials for culture, etc. The waste may also be ground to form smaller particles, such as powders.

When the waste to be treated is damp, as may be the case with fibrous products used for plant culture, it is advantageous to dry the waste at least partially prior to pyrolysis in order to eliminate the water vapor at a lower temperature, and thus avoid adding these vapors to the processing gases.

The composition and temperature of the gas used for treating the waste according to the invention are essential factors. In fact, the aim of the invention is to achieve the pyrolysis, preferably almost total pyrolysis, of the organic material contaminating the waste substrate without melting the vitreous material constituting the substrate, in order to avoid recovering a molten mass which could still contain undesirable organic matter. For this purpose, it is essential that the temperature of the gas used for the combustion of the organic material be lower than the melting temperature of the material forming the substrate.

When the waste consists of glass fibers, the temperature of the processing gas is preferably 100° C. lower than the melting temperature of the vitreous material forming the fibers. In particular, this temperature is less than 550° C.

The treatment temperature is preferably as high as possible, but still within the conditions described above, in particular when the waste contains a large amount of organic material, in order to recover the product in a good yield. However, the use of too high a temperature presents the risk of zones forming in which the vitreous material may at least start to melt, which the method of the invention intends to avoid. Therefore, in this case, it is preferable for the duration of the treatment to be as short as possible.

It is possible to use lower temperatures, the lower limit being the decomposition temperature of the organic material, but this would cause the method to be too slow, and therefore, give an unsatisfactory yield.

The processing gas used in the invention is also an important factor. It should not create combustion areas in which fusion of the vitreous material would occur, which is the case when air is the processing gas. In accordance with the invention, an inert gas such as nitrogen is used. It is also possible to use combustion gases or fumes, and in particular, fumes resulting from the pyrolysis method itself, recycled in a suitable manner.

It has been found to be preferable for the implementation of the invention that the processing gas further comprise oxygen in order to facilitate pyrolysis of the organic material. The amount of oxygen should not be very great, so as to prevent the formation of heat foci causing local increases in temperature which would result in the fusion of the vitreous material. In accordance with the invention, up to 10% by volume of oxygen, preferably up to 5%, and most preferably between 1 and 3% is used. When the waste is being treated, these gases pass through the bed formed by this waste on the conveyor belt (see FIGURE).

The gases recovered, after the waste has been pyrolyzed, include decomposition gases from organic material. The amount of heat supplied to the system is preferably such that the temperature of the gases recovered is at least 350° C., such that any condensation on the walls of the vapor recovery devices is avoided.

Preferably, the gases recovered after pyrolysis are recycled after passing through a combustion chamber, in order to burn the gases resulting from the pyrolysis of the organic materials. The heat output from combustion of the organic materials is then used to reheat the fumes to be recycled from 350° C. to the temperature required for the pyrolysis method according to the invention. Thus, the pyrolysis apparatus is able to operate autonomously.

In order to determine the gas flow suitable for the waste treatment, the thickness of the waste bed and the compacting density of the waste under the pressure of the gas should be taken into account.

The gas flow should be sufficient to maintain an appropriate pressure, taking into account the thickness of the waste bed to be treated, such that exaggerated compacting of the waste is avoided. Charts prepared in a known manner on the basis of measurements of gas pressure or velocity and the compactability of the waste enable the flow rates to be selected in order to attain this goal.

In order to take account of the demands connected with obtaining a good yield, i.e. the maximum quantity of waste treated in a given time, it is possible to pyrolyze in a suitable manner a mass of waste having a thickness of approximately 70 to 80 cm before compacting and a density under the gas pressure of 25 to 50 kg/m$^3$, preferably about 30 kg/m$^3$. A lower density enables complete pyrolysis, but the yield is not as good. On the other hand, the treatment of waste having a higher density is also possible if complete pyrolysis of the organic materials is not required for the subsequent use of the product recovered.

The velocity of the gas flow depends on the duration of the treatment.

The pyrolysis processing time may vary depending on the desired result, i.e. depending on the percentage of organic material which must be eliminated. It also depends on the thickness of the waste mass to be treated. In the case of glass fiber waste, having a thickness and density indicated above, the duration of treatment for essentially complete pyrolysis of the organic materials usually is of the order of from 30 to 35 minutes.

At the end of pyrolysis, the vitreous material which forms the waste substrate is recovered, which according to the pyrolysis conditions used, is free from organic materials to the desired extent. As indicated above, this vitreous material is in the initial form of the substrate treated, for example, in the form of flakes or powder.

These recovered products, if desired after grinding if they are flakes, can be used directly in glass melting furnaces.

Having generally described this invention, a further understanding can be obtained by reference to the specific example which is provided herein for purposes of illustration only, and is not intended to be limiting.

EXAMPLE

In accordance with one embodiment of the invention, dry flakes of mineral fibers from an insulating product containing 6% of a phenoplast binder are introduced into the pyrolysis furnace.

The flakes form a bed having a thickness of 70 cm and a density of 40 kg/m$^3$. The processing gas at the inlet of the pyrolysis apparatus comprises 88.7% nitrogen and 1.3% oxygen. The temperature of the inlet gas is 500° C. The temperature of the outlet or discharge gases is 350° C. The velocity at which the inlet gas passes through is 0.11 m/s. After treatment for 30 minutes, the vitreous material, in the form of flakes which are whitish in color and have an organic material content between 0 and 1.2%, is recovered. This corresponds to an elimination of 85% of the binder.

The method according to the invention has numerous advantages. Apart from those indicated above, i.e. recovery of the non-reduced vitreous material in its initial form and direct use thereof as cullet in glass melting furnaces, the elimination of a substantial quantity (at least 85%), or even the entirety of the organic material, for example, comprising the insulating mineral fiber binder, can be achieved by restricting the amount of oxygen added to the furnace.

Furthermore, the method according to the invention eliminates the problems of storing the waste, and enables a base material, the expensive vitreous material, to be recovered.

Furthermore, the recycling of the vapors allows autonomous operation, and prevents fumes from being discharged into the atmosphere.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. A pyrolysis furnace for the treatment of a mineral fiber substrate contaminated with at least one organic substance, comprising:
   (1) an elongate chamber having a top and a bottom,
   (2) an inlet hopper at the top of said chamber provided with an air lock system for regulating the inlet delivery of mineral fiber substrate and for controlling the atmosphere of the furnace,
   (3) an outlet hopper at the bottom of said chamber provided with an air lock system for regulating the outlet delivery of mineral fiber substrate and for controlling the atmosphere of the furnace,
   (4) a conveyor belt for conveying said substrate from below said inlet hopper to above said outlet hopper, said belt provided with perforations and having a plurality of adjustable flaps on the inside thereof in order to allow gas to flow through said substrate and said conveyor belt and to control the pressure of said gas,
   (5) a pipe at the top of said chamber for the introduction of a gaseous mixture heated to a temperature less than the melting temperature of said substrate, said gaseous mixture comprising a neutral gas and from 0 to 10% by volume of oxygen,
   (6) a deflector disposed opposite to the aperture of the pipe at the top of said chamber for distribution of the gaseous mixture entering the chamber, and
   (7) a pipe at the bottom of said chamber for the removal of gas passed through said substrate and said conveyor belt.

2. The furnace of claim 1, further comprising a gas recycling device which carries gas from said pipe at the bottom of said chamber to said pipe at the top of said chamber.

3. The furnace of claim 2, wherein said gas recycling device further comprises a combustion chamber.

4. The furnace of claim 1, wherein said air lock systems are drums provided with cells arranged inside said inlet and outlet hoppers.

5. The furnace of claim 1, further comprising a plate for regulating the thickness of said substrate deposited on said conveyor belt.

6. The furnace of claim 1, further comprising a shield disposed beneath said conveyor belt to insure that gas emanating from said pipe at the top of the chamber passes through said conveyor belt before entering said pipe at the bottom of said chamber.

* * * * *